Nov. 29, 1938.   R. H. GORDON   2,138,095
CONVEYER MECHANISM
Filed Nov. 15, 1937   2 Sheets-Sheet 1
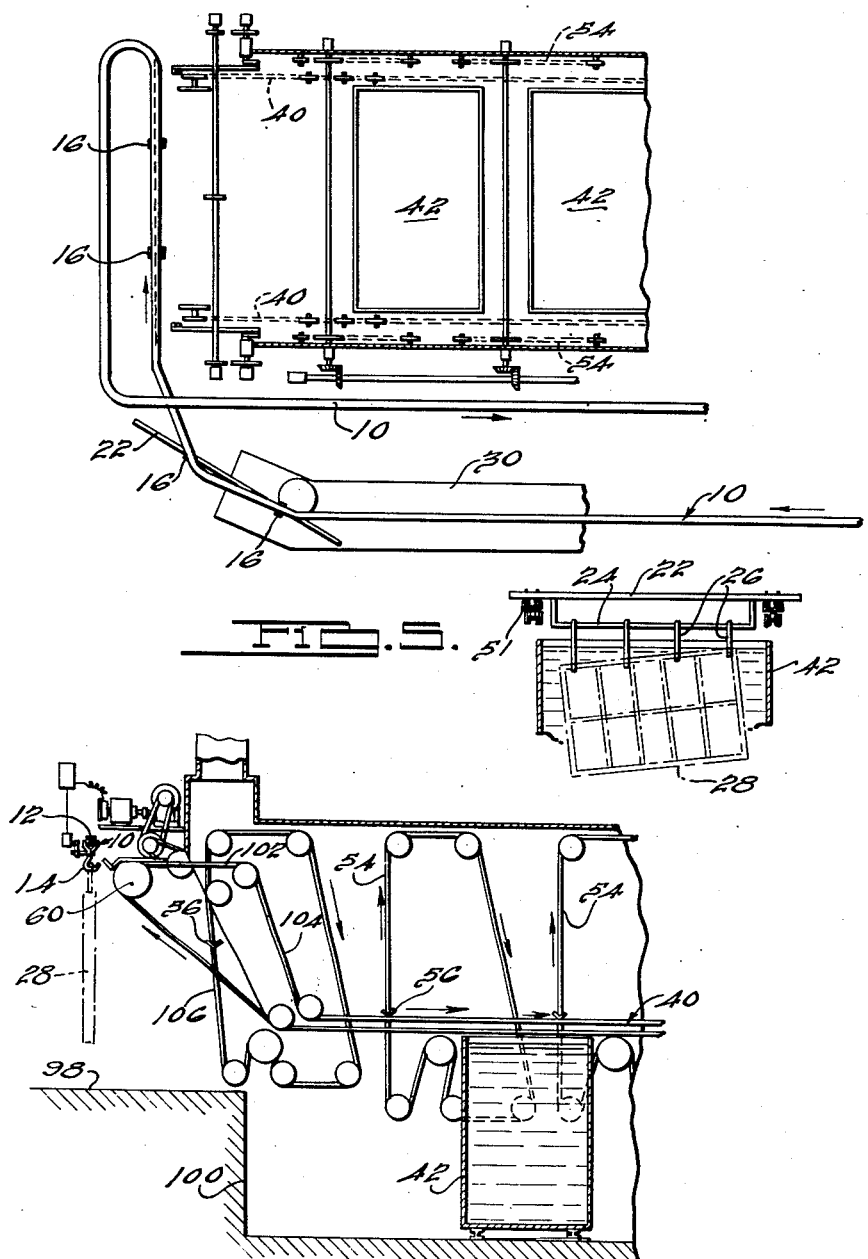
INVENTOR
Robert H. Gordon.
BY
Harness, Dickey & Pierce
ATTORNEYS.

Nov. 29, 1938.    R. H. GORDON    2,138,095
CONVEYER MECHANISM
Filed Nov. 15, 1937    2 Sheets-Sheet 2
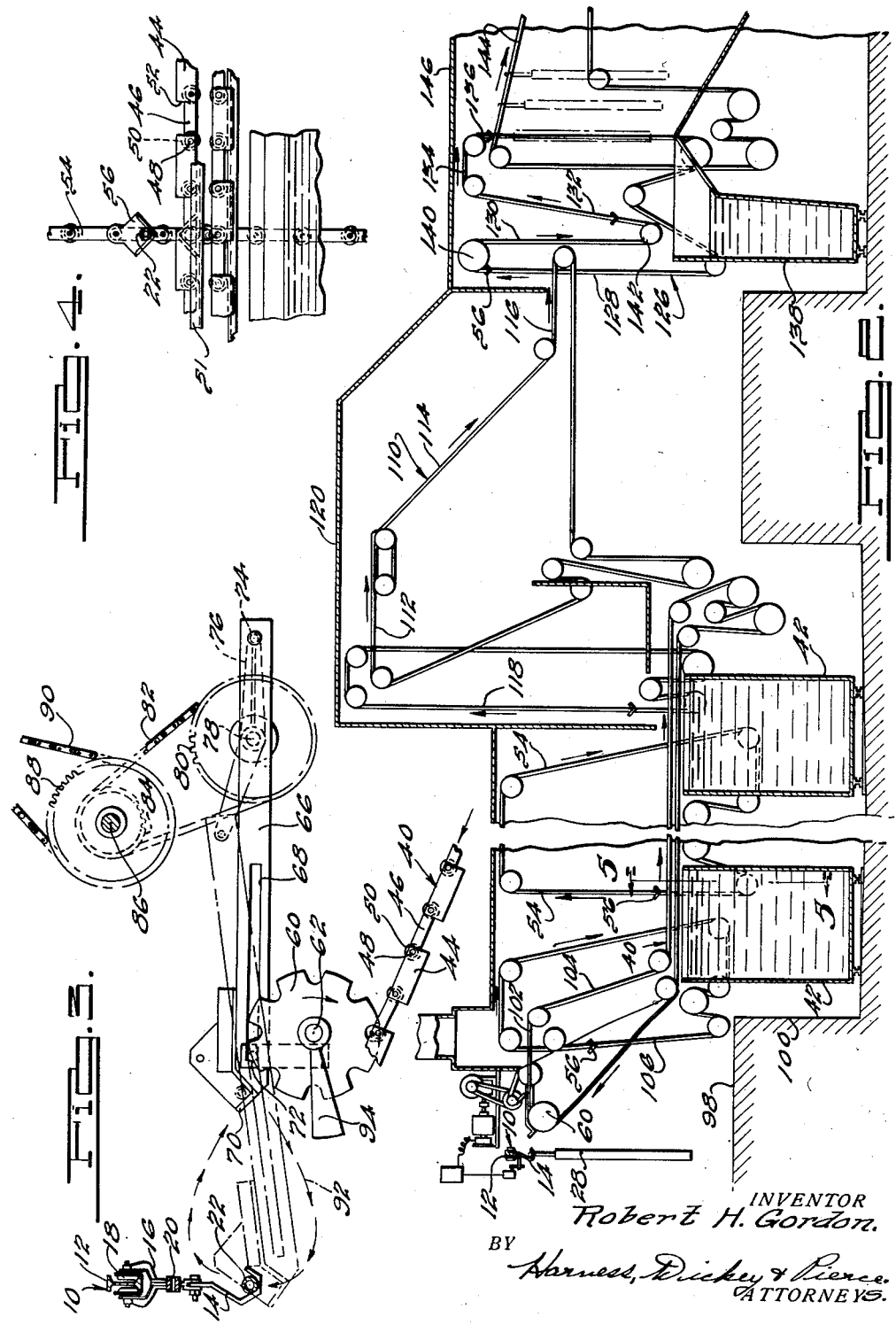
INVENTOR
Robert H. Gordon.
BY
Harness, Dickey & Pierce.
ATTORNEYS.

Patented Nov. 29, 1938

2,138,095

UNITED STATES PATENT OFFICE 2,138,095

CONVEYER MECHANISM

Robert H. Gordon, Detroit, Mich.

Application November 15, 1937, Serial No. 174,614

6 Claims. (Cl. 214—17)

This invention relates to conveyer mechanisms and particularly to that type thereof including endless chains to which articles to be transferred and/or treated are suspended.

Objects of the invention are to provide a conveyer mechanism having certain novel features by means of which certain installations may be constructed of a minimum length, by which articles may be transported at maximum speed, and which results in economy in installation and operation; to provide a conveyer mechanism including a main chain arranged with its runs in vertical alignment and horizontal portions of one of the runs arranged at different elevations, together with a transfer chain for quickly conveying articles from one of the horizontal portions to another; to provide a conveyer mechanism in which articles are conveyed on a single chain mono-rail system and are transferred to a double chain system for certain operations, the mono-rail system being located at a different elevation than the main portion of the double chain system, together with means of novel character for effecting the transfer of the articles from the mono-rail to the main portion of the double chain system; to provide a conveying mechanism including double rail or chain portions of which are arranged at different elevations, together with transfer mechanism for effecting transfer of articles from one elevation to another thereby to permit a shortening of the overall length of said mechanism as compared to conventional installations; to provide a construction as above described in which the transfer mechanism in addition serves to both raise and lower articles carried by it above and below the plane of the cooperating main conveyer sections, and in general to provide a construction of the type described that lends itself to adaptation to a variety of different conditions, commonly met with in conveying systems in a simple, economical and effective manner.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Figure 1 is a more or less diagrammatic fragmentary plan view of a conveyer mechanism including a mono-rail system and a double rail system between which articles are adapted to be transferred;

Fig. 2 (sheet 2) is a more or less diagrammatic vertical sectional view taken centrally through the construction shown in Fig. 1 together with additional apparatus connected thereto;

Fig. 3 is an enlarged fragmentary side elevational view illustrating the mechanism employed for transferring articles from the mono-rail system to the double rail system;

Fig. 4 is an enlarged fragmentary side elevational view showing a portion of a main conveyer chain and of a transfer conveyer chain and illustrating the manner in which these cooperate with one another;

Fig. 5 (sheet 1) is an enlarged transverse sectional view taken on the line 5—5 of Fig. 2 illustrating one of the article carriers supported on the double rail system;

Fig. 6 is a view similar to a portion of Fig. 2 but illustrating a slightly modified form of the invention.

In my co-pending application for Letters Patent of the United States filed February 14, 1935, Serial No. 6,417, now Patent No. 2,103,901, on Conveyer mechanism I show and claim a novel construction by means of which articles placed upon a mono-rail conveyer system to be conveyed and/or treated while carried thereby, are transferred to a double rail conveyer system for further treatment and are then transferred back to the mono-rail system for further treatment and/or removal. The present invention employs all of the features disclosed in said co-pending application and, accordingly, reference may be had thereto for a clearer understanding of the present invention. The present invention, however, in addition to the apparatus desicribed in said co-pending application, provides means by which conditions arising in certain installations may be more effectively disposed of than were such conditions taken care of in a conventional manner.

Referring to the drawings and particularly to Fig. 1, the numeral 10 indicates a portion of a mono-rail conveying system travelling in the direction indicated by the arrows. The mono-rail 10 is of conventional construction which as illustrated best in Fig. 3 includes a weight carrying member comprising an I-beam 12 positioned with its web in vertical relation and from which depends at spaced intervals hooks 14. The hooks 14 are carried by double armed brackets 16 which straddle opposite sides of the I-beam 12 and carry rollers 18 at their upper ends which ride on the upper faces of the lower flanges of the I-beam on opposite sides of its central web. The brackets 16 are all connected together in driving relationship by means of a conveyer chain 20 and suitable means (not shown) are provided for driving the chain 20.

In accordance with the present invention the articles to be transferred by the conveyer mechanism and treated during its path of travel thereon are supported from the hooks 14 by means of bars 22 (see Fig. 5) extending between adjacent pairs of hooks 16. In the case illustrated the bars 22 are each provided with a supplementary bar 24 downwardly spaced therefrom and from which is suspended a plurality of hooks 26 upon which the articles to be treated are suspended, the articles shown by way of illustration in the present case comprising the steel window frames 28. It will thus be observed that when the work carrying bars 22 are travelling along the mono-rail 10 they lie in parallelism therewith and the bars 22 themselves are arranged in end-to-end relationship. This end-to-end arrangement of the bars 22 is advantageous for certain operations such, for instance, as loading and unloading, washing, and the like, and in Fig. 1 a washing booth 30 is shown through which the mono-rail 10 extends and within which a spray or jet of hot water or other suitable substance may be directed at the articles being transferred so as to remove grease and dirt therefrom.

Where articles carried by the mono-rail 10 are to be subjected to an operation which will consume an appreciable length of time as, for instance, where the articles are to be subjected to a rust proofing operation by immersion in a rustproofing solution as may be assumed in the present case by way of illustration, were the articles to be kept on the mono-rail during such treatment it is obvious that it would require a tank of unusually long proportions to effect the treatment. Not only would this be expensive in that it would require an immense volume of rustproofing solution which is relatively expensive in and of itself, but the cost of the tank and other equipment would be exceedingly large and such equipment would require an unusually large amount of floor space in a factory to accommodate it. Accordingly, in order to overcome these disadvantages, and as disclosed in my co-pending application above identified, the articles are transferred from the mono-rail system 10 to a double rail system in which the article holders 22 are arranged with their axes extending transversely to the direction of their travel thereon so that they may be arranged in closely adjacent relationship. At the same time the double rail conveyer has a relatively low rate of movement so that articles suspended therefrom in a solution or the like are subjected to the effects of the solution or the like during a desired length of time but without having travelled more than a relatively short distance. This arrangement permits the use of relatively small tanks holding limited quantities of solution or the like and occupying a minimum amount of floor space, and thus overcome the disadvantages which would occur if it were attempted to use the mono-rail system for such operations, all as pointed out above.

The double rail system one end of which is indicated in Fig. 1 includes a pair of transversely spaced complementary chain sections 40 disposed in parallel relation and with the center line between them arranged in perpendicular relation with respect to a cooperating section of the mono-rail 10. Arranged between the double sections 40 and extending therebetween are a plurality of tanks 42 arranged one after the other and which may contain by way of illustration hot water, rust proofing solution, cold water, and an acid rinse respectively, to each of which the articles being carried by the double rail conveyer are destined to be subjected in turn.

The chains 40 of the double rail conveyer may be of the type illustrated in Figs. 3 and 4 including alternate pairs of relatively wide outer links 44 and narrow inner links 46 adjacent ends of which are pivotally connected together by means of pins 48 carrying rollers 50 between opposite pairs of links, the rollers 50 adapted to ride in the channels 51, illustrated in Fig. 5 forming the two rails of the double rail conveyer. One side edge of the wide links 44 are arranged in flush relationship with the corresponding side edge of the narrow links 46 at each end thereof so that on the opposite side or edge of the chain a pocket 52 is formed between opposed ends of adjacent wide links 44, and it is in these pockets 52 that the ends of the support 22 are adapted to be received and to be positively moved thereby.

In order to transfer the supports 22 and the work carried thereby from an immersed condition in one tank 42 to an immersed condition in the next adjacent tank 42, cooperating pairs of endless transfer chains 54 are provided at adjacent sides of adjacent tanks. The transfer chains 54 are of conventional construction and are each arranged outwardly of the corresponding ends of cooperating tanks and extend both above and below the upper edges of such tanks. Both chains of each pair of transfer chains 54 are driven at the same speed and in timed relation with respect to but at a higher rate of speed than the chains 40 and, as best illustrated in Fig. 4, each transfer chain 54 on its inner face is provided at spaced intervals with brackets 56, the brackets 56 engaging the opposite end portions of each load supporting bar 22 as it passes along the double chains 40, lifting the bar 22 and its load upwardly a sufficient distance to clear the top of the tanks, then transferred in the direction of movement of the corresponding run on the chains 40, and then lower the load supports 22 upon the chains 40 beyond the near edge of the next adjacent tank.

In order to transfer the load supporting bars 22 and the parts carried thereby from the mono-rail system 10 to the double rail system 40, mechanism as illustrated in Fig. 3 and as more fully disclosed in my co-pending application above identified is employed, although it will be recognized that in the broader aspects of the present invention any suitable mechanism may be employed for this purpose. As illustrated in Fig. 3 each main chain 40 passes over a sprocket 60 suitably mounted for rotation about the axis of a shaft 62 which is arranged in parallelism with that portion of the mono-rail 10 from which it is desired to remove the holders 22. It will be understood from an inspection of Fig. 3 that the sprocket 60 turns in a clockwise direction of rotation and that the upper run of the chain 40 extends in a horizontal direction immediately after leaving the sprocket 60. The present description will be confined to the transfer mechanism at one side only of the double rail conveyer, it being understood that the mechanism at the opposite side is identical and is moved in timed relation therewith. This mechanism includes an arm 66, one end of which is slotted as at 68 and the extremity of the slotted end is provided with an upwardly facing hooked end portion 70. A fixed pin 72 is slidably received within the slots 68. The opposite end of the arm 66 is pivotally connected at 74 to the free end of a crank arm 76 fixed to a shaft 78 for equal rotation therewith. The shaft 78 is driven by means of a sprocket 80 fixed thereto, a cooperating chain 82 which is trained around an additional sprocket 84 secured in turn to a shaft 86 driven by means of a sprocket 88 and chain 90 from a suitable source of power.

It will be appreciated that rotation of the crank arm 76 will cause the corresponding end of the arm 66 to travel in a circle thus causing the arm 66 to reciprocate as well as to oscillate and with the particular arrangement of parts as shown the hooked end 70 will travel in the path indicated by the arrows 92 and which path intersects the path of movement of the carriers 22 on the mono-rail 10, the movement of the hooked end at this point being in a vertically upward direction. The arms 66 are driven in timed relation with respect to both the monorail 10 and the double rail chain 40 so that when a carrier 22 on the mono-rail 10 becomes transversely aligned with the double rail section the hooked end 70 will engage the opposite end portions of a support 22, will lift it off of the monorail 10, and will deposit it upon the chains of the double rail section adjacent the top of the sprocket 60 where it will be caused to move onto the upper run of the chains 40 by means of arms 94 fixed to the opposite end of the shaft 62 for equal rotational movement with the corresponding sprocket 60. In this manner the carriers 22 and the load supported by them are transferred from the mono-rail system to the double rail system.

The apparatus thus far described is identical to that disclosed in my copending application above identified. In that application the monorail and the main portion of the upper or load carrying run of the double rail system are arranged in substantially the same horizontal plane, the tanks corresponding to the tanks 42 herein being seated upon a floor so that their upper edges are arranged in adjacent relationship to the plane of the mono-rail. In some instances, as in the case illustrated herein, it is desirable to sink the tanks into the floor of the building in which they are situated for several reasons, one of which may be to reduce the overall height of the building. In such case the mono-rail system will, of course, be supported at such height above the floor of the building as will provide the necessary clearance between any article intended to be carried by the mono-rail system and the floor and it will, therefore, be necessary in transferring the articles and the holders from the mono-rail system to the double rail system and particularly to a point where such articles are immersed in the tank, to lower such articles through an appreciable vertical distance.

It is desirable, if not necessary, in the transfer of articles from the mono-rail 10 that the supports 22 be transferred directly to the relatively slowly moving chains 40 so as to provide for an appreciable time interval in the double chain position during which the work support 22 may be received by it, this being necessitated by such factors as wearing of chains and other parts of the apparatus and which otherwise might require too exacting accuracy in the manufacture, adjusting and operation of the various parts of the system to be commercially practicable. Under such conditions the conventional manner of transporting the work carriers 22 and the work supported thereby from the elevated portion of the main double rail conveyer chain to a position in which the work is submerged in the first tank would be simply to run the main chain downwardly over the first tank at an angle to the horizontal so that as the work carried by the chain moves downwardly, it would gradually enter the tank and be submerged by the contents thereof. Such a conventional arrangement would, however, necessitate that such portion of the main conveyer chain be extended at an appreciable angle to the vertical for otherwise the work carried by the successive work holders 22 deposited upon the main chain would either pile up on the inclined portion, or else when the horizontal portion of the main chain is reached the work would be spaced at too great a distance from each other.

In accordance with one phase of the present invention the work carriers 22 and the work supported thereby is transferred from the upper level of the main chain at the point of reception of the carriers 22 thereon to the lower level thereof positioned immediately above the tanks 42 in such a manner as to eliminate the necessity of such incline, as well as the possibility of the work piling up on each other during such portion of the travel, without restricting the minimum clearance between adjacent work holders on the main portion of the double chain above the tanks 42 and, as will be obvious, this permits the overall length of the apparatus to be materially shortened and, accordingly, permits the apparatus to be housed in a building of less length than would otherwise be possible.

Referring to Fig. 2 it will be noted that the level of the floor is indicated at 98 and that the tanks 42 are positioned within a pit 100 so that the tops of the tanks 42 are positioned only a slight distance above the surface of the floor 98. The main upper horizontal runs of the double chains 40 are positioned a short desired distance above the tops of the tanks 42. The short horizontal runs 102 of the double chains 40, as previously mentioned, are provided for the purpose of supplying a slow moving means for initially receiving the work supports 22 removed from the mono-rail system and transferred to the double rail system. It will be noted that the portion 102 of each of the chains 40 are connected to the main upper horizontal and load carrying run of the corresponding chain 40 by a steeply inclined portion 104 which, as previously described, in the present case is of such steep inclination that were it attempted to carry the load supports 22 downwardly thereon either the work carried by the supports 22 would pile up on the portion 104 or else the supports 22 would be required to be spaced from each other to such an extent as to seriously restrict the amount of work capable of being simultaneously processed by the mechanism described.

In order to employ this deep angularity for the portion 104 a pair of transfer chains 106, one positioned on each side of the double chains 40 are provided. The transfer chains 106 are of similar character to the transfer chains 54 in that they are provided with brackets such as the brackets 56 illustrated in Fig. 4 for the purpose of lifting work supports 22 from the double chains 40 at one point and redepositing them thereon at another point, and are driven in timed relation with respect to the double chains 40 but at a materially higher rate of speed. In the present case the upwardly moving runs of the transfer chains 106 pick up work supports from the rear end of the upper runs 102 of the double chains 40, transfer them horizontally in the direction of movement of the upper runs of the chains 40 to a point beyond the inclined portion 104 of the chains 40, and then carry them downwardly and deposit them upon the upper main runs of the chains 40 at a point above the first tank 42. Upon reaching the upper main runs of the chains 40 such work supports 22 are carried horizontally thereon until they reach the first transfer chain 54 which then picks the work supports up together with the work carried thereby and pass them over the adjacent sides of the adjacent tanks so as to deposit the work supports upon the upper main runs of chains 40 over the next adjacent tank and with the work submerged in the liquid within in such next tank.

It is impracticable to attempt to transfer the work supports 22 directly from the mono-rail system to the transfer chains 106 because their relatively high rate of speed requires too exacting operation and adjusting of the transferring mechanism between the mono-rail system and the double rail system. Thus by employing the short horizontal runs 102 of the double chains 40 for initial reception of the articles from the mono-rail system to the double rail system and then almost immediately transferring the work supports and the work carried thereby from the end portions 102 to an operative working position upon the main runs of the double chains 40, a quick transfer is provided enabling speeding up of the work, the use of the transfer chains 106 permit a shortening of the overall length of the apparatus as compared to conventional constructions, and by fixing the tanks 42 in the floor of the building the overall height of the building may be reduced.

It is not necessary, in transferring the work supports 22 from the upper short run 102 of the main chains 40 to the main upper horizontal runs thereof that the work carried by the work supports be immediately immersed in the liquid contents of a tank 42, as under some circumstances it may be desirable to first deliver the work supports 22 to the main upper runs of the main portion of the double chains 40 with the work positioned exteriorly of a tank 42. This may be particularly true where it is desired to subject the work to some initial step of operation not involving an immersion of the work in a liquid solution. In such case a construction such as disclosed in Fig. 6 may be resorted to. Referring to Fig. 6 it will be noted that the construction there shown is identical to the lefthand portion of Fig. 2 with the exception that the foremost tank 42 has been eliminated, thus obtaining the result referred to above.

After the work has been submerged in the last tank of liquid in an apparatus of the general class described, it is usually desirable to remove the work from the tank and subject it to a quick drying operation. Ordinarily this is accomplished in the manner shown and described in my copending application above identified, namely by directing the main upper runs of the double chain conveyer upwardly from a point over the last tank into a drying chamber the air in which is suitably circulated and heated. Such a conventional construction, however, requires that the last tank to be of a sufficient length or conformation to permit the work to be moved upwardly there out of at the same angle as the corresponding portion of the conveyer. The angularity of this inclined portion of the conveyer with respect to the horizontal cannot, however, be too great for otherwise, as previously explained, the spacing between the work supports on the conveyer must be lengthened out to prevent piling up of the work on the inclined portion. In order to permit a further shortening of the entire apparatus as compared to conventional constructions, the following mechanism is provided and which forms the subject-matter of my co-pending application for Letters Patent of the United States for improvements in Conveyer mechanism, filed July 5, 1938, Serial No. 217,409, the same being a division of the present application.

A pair of transfer chains are provided at the discharge end of the last tank so as to receive the work supports 22 and work carried thereby and to transfer them vertically upwardly at a relatively rapid rate to a pair of slow moving conveyer chain portions located at a material distance above the tops of the tanks within a suitable drying chamber. These slow moving conveyer portions to which the work is transferred as just mentioned may be portions or continuations of the main conveyer chains 40, or may be a separate pair of conveyer chains driven at the same speed as the chains 40 or at some other desirable relatively slow rate of speed. In the present case the last assumed construction is shown, that is, a separate pair of relatively slow moving conveyer chains 110, similar in all respects to the main conveyer chains 40, are provided and include an upper horizontal run 112, an inclined run portion 114 and a lower horizontal run portion 116, the same being suitably driven by conventional means and in timed relation with respect to the main conveyer chain 40. A pair of transfer chains 118 each including a vertically upwardly moving run adapted to receive the work supports 22 from the main conveyer chains 40 are provided for transferring the work supports from the discharge end of the last tank 42 to the upper runs 112 of the double chains 110. It will be understood that the chains 110 are positioned within a drying oven 120 which may be of any suitable or conventional construction. It will be appreciated from the above that in accordance with this phase of the present invention the last tank 42 may be made of minimum length, that the spacing between work supports 22 on the main chains 40 may be maintained at a minimum because of the fact that no portion of the main chain 40 upon which the work supports are carried extends in any other than a horizontal position and that, accordingly, the overall length of the apparatus may be maintained at a minimum and materially shorter than by following conventional practices.

Where the operations for which the apparatus is designed are completed upon completion of the stage of operation described above, namely, the drying of the work, then the work supports 22 and the work carried thereby may be removed from the conveyer chains 110 and re-deposited upon the mono-rail system 10 if desired in the same general manner as described in connection with my copending application above identified. In some cases, however, and as assumed in the present case, after the work has been subjected to a suitable rust proofing treatment and the work has been dried it may be desirable to coat the work with paint, enamel or the like and in the present case it is assumed that this operation is desired and will be accomplished by a dipping operation. Under such circumstances it will be appreciated that inasmuch as no chemical reaction takes place between the paint or enamel, or the work no extended time element of immersion of the work in the paint or enamel is required. In other words the only requirement is that all surfaces of the work be immersed in the paint or enamel so as to be coated thereby and may immediately be removed as soon as such immersion is complete.

In accordance with conventional practice in utilizing apparatus of the general type under discussion the immersion of the work in the paint would be accomplished in the same general manner as above described in connection with immersing the work in the liquid contained in the tanks 42, namely by transferring work supports 22 to the slow moving pair of conveyer chains over a tank and then removing the carriers and work by means of an additional pair of conveyer chains. However, in accordance with the disclosure in my co-pending application for Letters Patent of the United States for improvements in Conveyer mechanism filed July 5, 1938, Serial No. 217,410, a division of the present application, this dipping operation is accomplished by the use of transfer chains only and by their use the time of immersion of the articles in the paint is reduced to a minimum and the length of the tanks and the volume of paint contained therein is also reduced to a minimum, this, of course, permitting a further decrease in the overall length of the entire apparatus.

Referring again to Fig. 2 it will be noted that at the discharge end of the conveyer chains 110 a pair of suitably driven transfer chains indicated generally at 126 are provided. The transfer chains 126 include a vertically upwardly moving run 128 adapted to remove the supports 22 from the discharge end of the chains 110, a vertically downwardly directed run 130, an upwardly directed run 132, a horizontally directed run 134, and a vertically downwardly directed run 136, all of which runs are arranged in the order named. A tank 138 containing a suitable quantity of paint, enamel, or the like is positioned below the lower end of the runs 130 and 132. Consequently any work supports 22 advancing toward the discharge end of the chains 110 are engaged by brackets 56 of the chains 126, are lifted upwardly therefrom, are transferred over the upper sprocket 140, are then carried downwardly on the runs 130 to such a position with respect to the top of the tank 138 that the work will be immersed in the paint within the tank 138, are then passed under the lower sprocket 142, then carried up the runs 132, then across the run 134 and down the run 136. Inasmuch as the transfer chains 126, as in the case of the transfer chains 54, 104 and 118 previously described, travel at a considerably faster rate than the chains 40 and 110 it will be appreciated that the work carried by the chains 126 will be quickly submerged in and removed from the paint in the tank 138.

It will, of course, be understood that after an article or piece of work has been dipped in the paint within the tank 138 sufficient time will be required to permit excess paint to drain off from it and will usually require it to be subjected to a drying operation so as to dry the coating of paint thus applied. This, of course, is preferably accomplished by depositing the thus paint dipped work onto a slow moving conveyer, and while such slow moving conveyer may be a part of or continuation of the conveyer chains 40, 110 or both thereof when the chains 40 and 110 are combined, in the present case this last slow moving conveyor is provided by means of a separate pair of slow moving chains 144 which may be of the same general construction as the chains 40 and 110 previously described. The chains 144 are positioned within a drying oven 146 and the work supports 22 and work carried thereby in travelling across the horizontal portion 134 of the chains 126 and then down the vertical portion 136 will be deposited upon the upper run of the chains 144 which will then slowly convey the work and its supports through the drying oven 146 from the discharge end of which they may be discharged onto the mono-rail 10 in accordance with the disclosure of my copending application above identified, or removed in any other suitable way.

Formal changes may be made in the specific embodiments of the invention described without departing from the spirit or substance of the broad invention the scope of which is commensurate with the appended claims.

What I claim is:

1. In a conveyer mechanism, in combination, a relatively slow moving endless chain including an upper run and a lower run, said upper run including horizontal portions arranged at different elevations, a relatively fast moving endless transfer chain arranged in adjacent relationship to the first mentioned chain, means for driving said chains in timed relation to each other, and means on said transfer chain for removing articles from one of said horizontal portions of the first mentioned chain and depositing it upon the other of said horizontal portions of the first mentioned chain.

2. In a conveyer mechanism, in combination, a pair of relatively slow moving endless chains arranged in parallelism and adapted to support work between them and to convey said work, each of said chains including an upper run and a lower run and each of said upper runs including a pair of horizontal portions arranged at different elevations, a pair of endless transfer chains arranged in adjacent relationship with respect to the first mentioned chains and each transfer chain including a run moving in an approximately vertical direction past one of said horizontal portions of the corresponding first mentioned chains and a second approximately vertically extending run movable past the remaining horizontal run of the corresponding of the first mentioned chains, means for driving said transfer chains in timed relation with respect to the first mentioned chains but at a relatively higher speed than the first mentioned chains, and means carried by said transfer chains for removing said work from one of said horizontal portions of the first mentioned chains and re-depositing said work upon the other of said horizontal portions of the first mentioned chains.

3. In a conveying mechanism, in combination, a pair of endless conveyer chains each including an upper run and a lower run and the upper run of each including a pair of horizontal portions disposed at different elevations with respect to each other, a tank of liquid positioned below the lower horizontal portion of each of said chains, an endless transfer chain associated with the upper and lower portion of each of said chains, means for driving said transfer chains in timed relation with respect to the first mentioned pair of chains and at a higher rate of speed, and means on said transfer chains for lifting a piece of work from said upper portions and positioning it in supported relation on said lower portions in immersed condition in said liquid within said tank.

4. In a conveyer system, in combination, a pair of endless conveyer chains each arranged in an approximately vertical plane and in parallel relation with respect to each other, each of said chains including an upper run and a lower run and each of said upper runs including a pair of horizontal portions arranged at different elevations, each of said horizontal portions of each of said chains being connected by a steeply inclined portion, an endless transfer chain associated with each of said first mentioned chains and each of said transfer chains including a vertically directed portion adapted to move approximately vertically in one direction past said upper horizontal portion of the corresponding of the first mentioned chains and a vertically directed portion adapted to move approximately vertically in the opposite direction past the lower horizontal portion of the corresponding of the first mentioned chains, means for driving the first mentioned chains at the same rate of speed, means for driving said transfer chains in timed relation with respect to the first mentioned chains but at a higher rate of speed, and means on said transfer chain for removing a piece of work supported between one of said horizontal portions of the first mentioned chains and depositing said work upon the other of said horizontal portions of the first mentioned chain independently of said steeply inclined portions of said first mentioned chains.

5. In a conveyer system, in combination, a mono-rail conveyer system adapted to support and convey a piece of work thereon, a double rail conveyer system arranged in adjacent relationship with respect to a portion of said mono-rail system, said double rail system including a pair of spaced parallel endless chains each including upper and lower runs, each of said upper runs including a pair of horizontal portions at different elevations, means for driving said pair of chains, means for removing a piece of work from said mono-rail system and supporting it between corresponding horizontal portions of said double rail system, transfer means for removing said work from the horizontal portions of said double rail system to which it has been transferred from said mono-rail system and depositing it upon the remaining horizontal portions of said double rail system, and means for driving the last mentioned transfer means in timed relation with said pair of chains and at a relatively higher rate of speed than the speed of said double rail chains.

6. In a conveyer system, in combination, a mono-rail system including a single endless chain adapted to support and convey a piece of work thereon, a double rail conveyer system including a pair of endless chains each including an upper and a lower run and each upper run of which includes a pair of horizontal portions arranged at different elevations, the upper horizontal portion of each of said double rail chains being arranged in adjacent relationship with respect to a portion of said mono-rail system and approximately in the same horizontal plane therewith, a pair of transfer chains one arranged adjacent to each of said double rail chains and including an upwardly directed portion moving upwardly past the upper portion of the adjacent one of said double rail chains and a downwardly moving portion moving downwardly past the lower portion of the adjacent one of said double rail chains, means for removing a piece of work from said mono-rail system and depositing it in supported relation between the upper horizontal portion of said double rail chain, means for driving said transfer chains in timed relation with said double rail chain and at a relatively higher rate of speed, and means on said transfer chains for picking up said piece of work from said upper horizontal portion and depositing said work upon said lower horizontal portion.

ROBERT H. GORDON.